United States Patent
Kang et al.

(10) Patent No.: US 7,767,618 B2
(45) Date of Patent: Aug. 3, 2010

(54) BI-PHASE PLATINUM CATALYST, METHOD OF MANUFACTURING THE SAME, AND SOLAR CELL USING THE BI-PHASE PLATINUM CATALYST

(75) Inventors: Moon-sung Kang, Yongin-si (KR); Ji-won Lee, Yongin-si (KR); Byong-cheol Shin, Yongin-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 0 days.

(21) Appl. No.: 12/167,595

(22) Filed: Jul. 3, 2008

(65) Prior Publication Data

US 2009/0173920 A1 Jul. 9, 2009

(30) Foreign Application Priority Data

Jan. 8, 2008 (KR) .................. 10-2008-0002334

(51) Int. Cl.
*B01J 23/42* (2006.01)
*B01J 23/60* (2006.01)
*B01J 23/62* (2006.01)

(52) U.S. Cl. .............. 502/326; 502/325; 502/329
(58) Field of Classification Search .......... 502/325, 502/326, 329; 252/514
See application file for complete search history.

(56) References Cited

U.S. PATENT DOCUMENTS

| | | | | |
|---|---|---|---|---|
| 5,635,439 A | * | 6/1997 | Fukui et al. ............... 502/328 |
| 5,795,559 A | * | 8/1998 | Pinnavaia et al. ......... 423/702 |
| 7,153,807 B2 | * | 12/2006 | Molinier et al. ........... 502/177 |
| 2004/0206667 A1 | * | 10/2004 | Calemma et al. ............ 208/57 |
| 2005/0016586 A1 | * | 1/2005 | Kim et al. .................. 136/263 |
| 2007/0095390 A1 | * | 5/2007 | Ahn et al. .................. 136/263 |
| 2007/0264189 A1 | * | 11/2007 | Adzic et al. ............... 423/604 |

* cited by examiner

*Primary Examiner*—Timothy C Vanoy
*Assistant Examiner*—Daniel Berns
(74) *Attorney, Agent, or Firm*—Stein McEwen, LLP

(57) ABSTRACT

A bi-phase platinum catalyst, a method of manufacturing the same, an electrode including the bi-phase platinum catalyst, and a solar cell including the electrode. The bi-phase platinum catalyst includes platinum particles and an amorphous metal oxide.

16 Claims, 7 Drawing Sheets

BI-PHASE PLATINUM CATALYST, METHOD OF MANUFACTURING THE SAME, AND SOLAR CELL USING THE BI-PHASE PLATINUM CATALYST

CROSS-REFERENCE TO RELATED APPLICATION

This application claims the benefit of Korean Application No. 2008-2334, filed Jan. 8, 2008, in the Korean Intellectual Property Office, the disclosure of which is incorporated herein by reference.

BACKGROUND

1. Field of the Invention

Aspects of the present invention relate to a bi-phase platinum catalyst, a method of manufacturing the same, and a solar cell using the bi-phase platinum catalyst.

2. Description of the Related Art

Solar cells use solar energy. Well-known solar cells include silicon solar cells and dye-sensitized solar cells. Silicon solar cells are relatively expensive, thus are not suitable for practical use, and have difficulties with regard to improving cell efficiency. On the other hand, dye-sensitized solar cells are significantly cheaper than silicon solar cells, and thus, may replace existing amorphous silicon solar cells. Unlike silicon solar cells, dye-sensitized solar cells are photo-electrochemical solar cells, which include dye molecules that can generate electron-hole pairs by absorbing visible rays, and transition metal oxides through which the generated electrons are transmitted.

A dye-sensitized solar cell includes a counter electrode having a catalyst and an electrolyte having redox ion couples. The counter electrode having the catalyst functions to reduce ions, so that electrons can be continuously supplied to the cell.

The catalyst may be formed of platinum, carbon, a conductive polymer, or the like. Platinum has the highest efficiency. However, since platinum is very expensive, the platinum content of the catalyst should be minimized, so as to reduce the manufacturing cost of the solar cell, while maintaining efficiency.

In order to reduce the platinum content, a method of controlling a surface characteristic of the catalyst is used. In order to deposit the catalyst on a conductive substrate, a method of producing a platinum thin film, by dissolving a platinum salt in solvent, spin-coating the dissolved platinum to form a thin film, and then calcinating the thin film. An electroplating deposition method, and a sputtering deposition method have also been proposed. Among these methods, the method of producing the platinum thin film is the most economical. However, when using the method of producing the platinum thin film, it is difficult to control the surface characteristic of the electrode containing the catalyst, and to uniformly form the electrode containing the catalyst on a substrate surface.

SUMMARY

Aspects of the present invention provides a bi-phase platinum catalyst formed through a self-assembly method using a polymer template, and a solar cell including the electrode, so as to improve photoelectric conversion efficiency.

According to an exemplary embodiment of the present invention, there is provided a bi-phase platinum catalyst comprising platinum particles and an amorphous metal oxide.

According to another exemplary embodiment of the present invention, there is provided a method of manufacturing a bi-phase platinum catalyst including platinum particles and an amorphous metal oxide, the method including: preparing a bi-phase platinum catalyst composition, by mixing block copolymers, a platinum precursor, a metal oxide precursor, and a solvent; and heat-treating the bi-phase platinum catalyst composition.

According to another exemplary embodiment of the present invention, there is provided a solar cell including an electrode comprising a bi-phase platinum catalyst. The bi-phase platinum catalyst comprises platinum particles and an amorphous metal oxide.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the exemplary embodiments, taken in conjunction with the accompanying drawings, of which.

DETAILED DESCRIPTION

Figure 1:
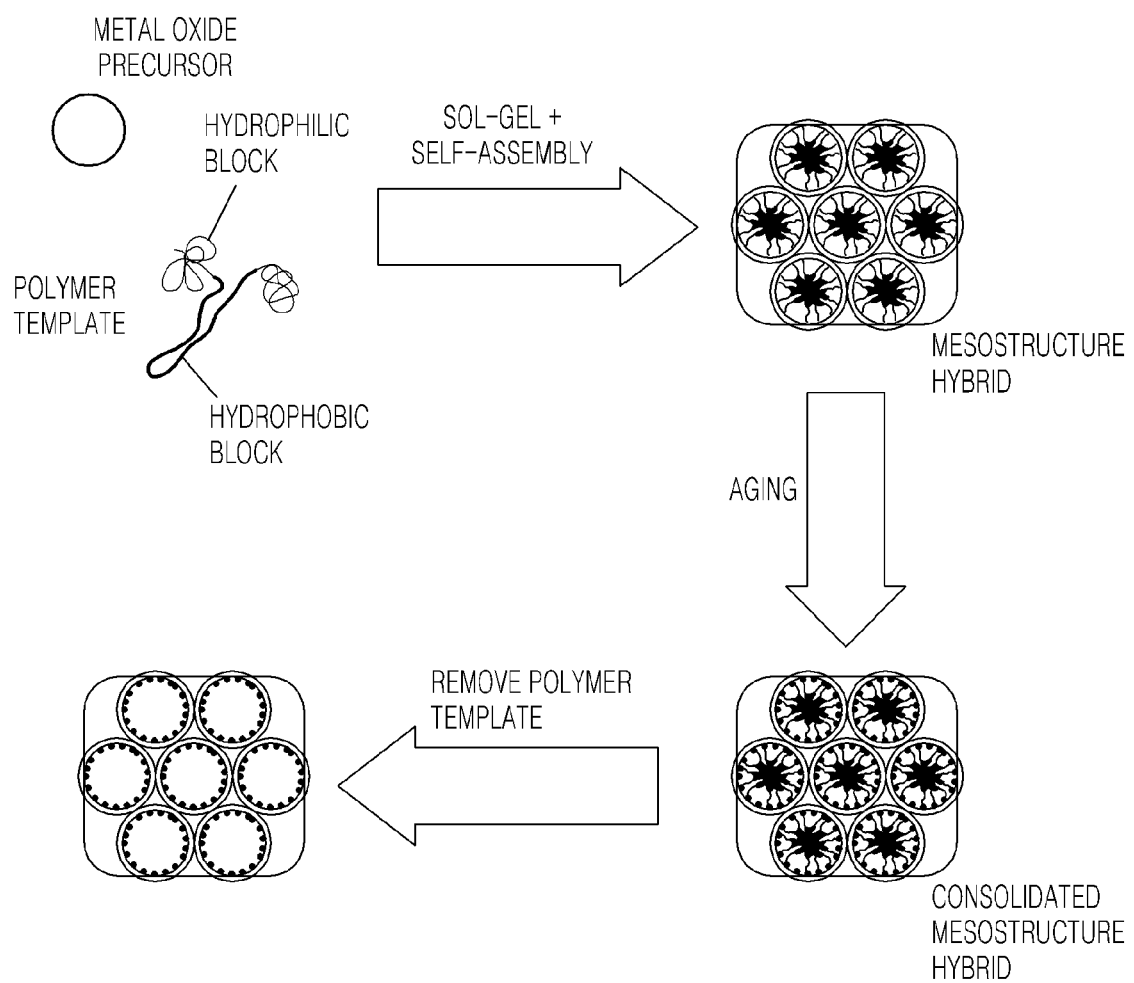
FIG. 1 schematically illustrates a process of forming a bi-phase platinum catalyst including platinum particles and an amorphous metal oxide, according to an embodiment of the present invention.

Reference will now be made in detail to the exemplary embodiments of the present invention, examples of which are illustrated in the accompanying drawings, wherein like reference numerals refer to the like elements throughout. The exemplary embodiments are described below, in order to explain the aspects of the present invention, by referring to the figures.

A bi-phase platinum catalyst, according to an exemplary embodiment of the present invention, includes platinum particles and an amorphous metal oxide. A mean diameter of the platinum particles is 1-10 nm, or for example, 2-5 nm. The term "bi-phase" refers to a platinum catalyst that contains two materials: platinum and an amorphous metal oxide. The amorphous metal oxide may be selected from the group consisting of titanium oxide ($TiO_2$), nickel oxide (NiO), tin oxide ($SnO_2$), zinc oxide (ZnO), and a combination thereof.

In the bi-phase platinum catalyst, the content of the platinum particles may be 50-200 parts by weight, based on 100 parts by weight of the amorphous metal oxide. When the content of the platinum particles is less than 50 parts by weight, based on 100 parts by weight of the amorphous metal oxide, the conductivity of a catalyst layer including the bi-phase platinum catalyst, and a catalyst effect thereof, are not sufficiently obtained. When the content of the platinum particles is greater than 200 parts by weight, based on 100 parts by weight of the amorphous metal oxide, it is difficult to control a diameter of the platinum particles, using the metal oxide, and a light scattering effect is not sufficiently obtained.

FIG. 1 schematically illustrates a process of forming a bi-phase platinum catalyst including platinum particles and an amorphous metal oxide, according to an exemplary embodiment of the present invention. In the method, a block copolymer including hydrophobic blocks and hydrophilic blocks is used as a polymer template. The polymer template is mixed with an amorphous metal oxide precursor, to form a micelle. In one exemplary embodiment, a moiety containing a metal, such as platinum, is located at the center of the micelle, and a metal oxide precursor, such as titanium alkoxide, may be located at an outer surface of the micelle. Conversely, the moiety containing a metal may be located at the outer surface of the micelle, while the metal oxide precursor is located at the center of the micelle.

Next, the resulting material is age-processed to form a consolidated mesostructure hybrid. The consolidated mesostructure hybrid is heat-treated to form a bi-phase platinum catalyst, through a sol-gel reaction, which removes the polymer template through thermal decomposition. At this point, the bi-phase platinum catalyst includes platinum particles surrounded by an amorphous metal oxide matrix (not shown).

The bi-phase platinum catalyst has a structure in which the platinum particles are surrounded by an amorphous metal oxide matrix. In an X-ray analysis, a main peak having a Bragg angle of $2\theta$, for a CuK-$\alpha$ x-ray wavelength of 1.541 Å, appears at 37-42°, and more particularly at 40±0.1°, i.e., 39.9-40.1°. A sub-peak appears at 45-48°, and more particularly at 46.5-47°. Additionally, one or more peaks, each having a relatively low intensity, may appear at 66-69°, and particularly at 67.5-68°, or at 80-83°, and more particularly at 81.5-82°.

A full width at half maximum (FWHM) value, of the main peak having an angle of $2\theta$, is 0.02-0.20 rad, and more particularly is 0.035-0.17 rad. The increase of the FWHM value shows that a grain size of the bi-phase platinum catalyst is reduced. For reference, the FWHM of a main peak having an angle of $2\theta$, of a typical platinum catalyst obtained by coating a platinum salt, is 0.01-0.02 rad.

In the bi-phase platinum catalyst, the main peak having the Bragg angle of $2\theta$, for the CuK-$\alpha$ x-ray wavelength of 1.541 Å, appears at 39.9-40.1°, and the sub-peak appears at 46.5-47°. In addition, when the Bragg angle of $2\theta$ is 40±0.1°, the FWHM value may be 0.035-0.17 rad.

In the bi-phase platinum catalyst having a structure in which the platinum particles are surrounded by an amorphous metal oxide matrix, according to an X-ray analysis, peaks each having a Bragg angle of $2\theta$ for the CuK-$\alpha$ x-ray wavelength of 1.541 Å appear at 40±0.1°, 46.5±0.5°, 67.5±0.5°, and 81.5±0.5°. When the Bragg angle of $2\theta$ is 40±0.1°, the FWHM value may be 0.035-0.17 rad. By performing a structural analysis with the above-described locations of the peaks and FWHM values, it is possible to identify the above-described bi-phase platinum catalyst.

A method of manufacturing a bi-phase platinum catalyst and an electrode using the bi-phase platinum catalyst, according to an exemplary embodiment of the present invention, will now be described. First, block copolymers, a platinum precursor, a metal oxide precursor, and a solvent are mixed, to form a platinum catalyst composition.

The block copolymers include a bi-block or tri-block hydrophilic block sequence. The block copolymers act as polymer templates that impart viscosity to the platinum catalyst composition, thereby improving a coating property, when coating the composition on a substrate. The block copolymers also improve the binding of a film containing the platinum catalyst to the substrate.

Nonrestrictive examples of the block copolymers include tri-block copolymers of poly(ethylene oxide)-poly(propylene oxide)-poly(ethylene oxide) (PEO1-PPO-PEO2), tri-block copolymers of poly(propylene oxide)-poly(ethylene oxide)-poly(propylene oxide) (PPO-PEO-PPO), and a combination thereof. An average molecular weight of the block copolymers is 3,000-50,000, for example, 5,000-10,000. When tri-block copolymers of PEO1-PPO-PEO2 are used, in an exemplary embodiment of the present invention, the content of the PPO blocks may be 50-300 parts by weight, based on 100 parts by weight of the PEO1 blocks. The content of the PEO2 blocks may be 50-300 parts by weight, based on 100 parts by weight of the PEO1 blocks.

In the platinum catalyst composition, the content of the block copolymers may be 50-200 parts by weight, based on 100 parts by weight of the metal oxide precursor. When the content of the block copolymers is less that 50 parts by weight, based on 100 parts by weight of the metal oxide precursor, micelles may not be properly formed by the block copolymers. When the content of the block copolymers is greater than 200 parts by weight, based on 100 parts by weight of the metal oxide precursor, a catalyst layer including the platinum catalyst is not formed to a sufficient density.

Any material from which $TiO_2$, NiO, $SnO_2$, or ZnO can be extracted through a sol-gel process, followed by heat treatment, may be used as the metal oxide precursor. For example, the metal oxide precursor may be a titanium alkoxide, such as titanium isopropoxide, titanium methoxide, or titanium ethoxide.

Any salt, from which platinum can be extracted through heat treatment, may be used as the platinum precursor. For example, the platinum precursor may be selected from the group consisting of $H_2PtCl_6$, $H_2PtCl_4$, $[Pt(NH_3)_4]Cl_2$, and a combination thereof. In the platinum catalyst composition, the content of the platinum precursor is 50-200 parts by weight, based on 100 parts by weight of the metal oxide precursor. When the content of the platinum precursor is less than 50 parts by weight, based on 100 parts by weight of the metal oxide precursor, the activity and conductivity of the platinum catalyst can be insufficient. When the content of the platinum precursor is greater than 200 parts by weight, based on 100 parts by weight of the metal oxide precursor, it is difficult to control the diameter of the platinum particles using a bi-phase metal oxide, and an improved light scattering effect is not sufficiently obtained.

The solvent may be acetylacetone, isopropyl alcohol, or the like. The content of the solvent may be 200-500 parts by weight, based on 100 parts by weight of the metal oxide precursor.

According to the an exemplary embodiment, before the block copolymers, platinum precursor, metal oxide precursor, and solvent are mixed, they are dissolved in respective solvents, so that they can be mixed with each other in solution states. Next, the bi-phase platinum catalyst composition is heat-treated to remove the block copolymers. The heat-treatment temperature may be 400-500°. When the heat-treatment temperature is less than 400°, the platinum and metal oxide are not sufficiently formed. When the heat-treatment temperature is greater than 500°, a conductive glass substrate, on which the platinum catalyst composition is applied, may be deformed.

An electrode may be manufactured by applying the above-described platinum catalyst composition to a conductive substrate and drying the applied composition. The method of application of the composition is not particularly limited. For example, the platinum catalyst composition can be applied to the conductive substrate using a spin-coating method, a deep coating method, or a screen-printing method. A non-surface area, of the bi-phase platinum catalyst obtained using the above-described processes, is about 200-300 m²/g greater than that of a conventional platinum catalyst.

As described above, by using the block polymers as polymer templates, it becomes easy to adjust surface characteristics, such as a size of the platinum particles, and a platinum metal oxide catalyst that can be easily coated can be obtained. By properly adjusting the diameter of the platinum particles, a platinum metal oxide catalyst, having a reduced platinum content, and improved light scattering, as compared with a conventional platinum catalyst, can be obtained.

According to an exemplary embodiment of the present invention, an electrode containing the above-described bi-phase platinum catalyst is provided. The electrode may be used for a solar cell. In particular, the electrode may be used as a catalyst electrode of a dye-sensitized solar cell. In this case, since a surface roughness of the electrode is increased, a binding force to a conductive substrate can be improved. Therefore, a catalyst electrode can be uniformly formed on a surface of the conductive substrate. Furthermore, the morphology of the catalyst electrode can be adjusted as desired. When using the above-described catalyst electrode, the photoelectric conversion efficiency of the solar cell can be improved.

Figure 2:
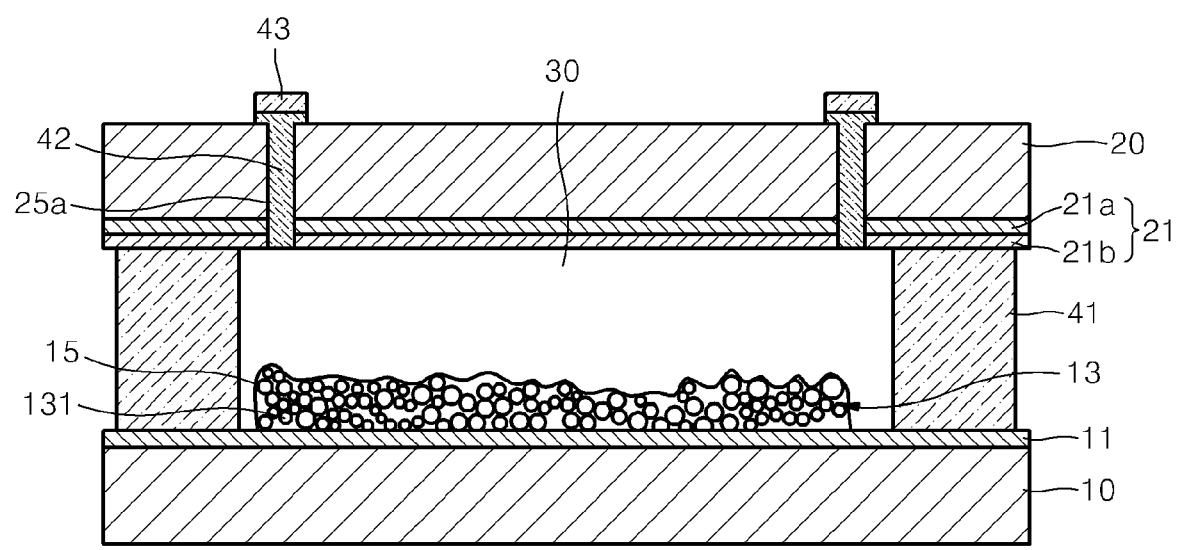
FIG. 2 is a sectional view of a dye-sensitized solar cell, according to an exemplary embodiment of the present invention.

FIG. 2 is a sectional view of a dye-sensitized solar cell, according to an exemplary embodiment of the present invention. Referring to FIG. 2, the dye-sensitized solar cell includes first and second substrates 10 and 20 that face each other. A first electrode 11, a porous layer 13, and dye 15 are formed on the first substrate 10. A second electrode 21 is formed on the second substrate 20. An electrolyte layer 30 is formed between the first and second electrodes 11 and 21. A case (not shown) may be disposed on outer surfaces of the first and second substrates 10 and 20.

The first substrate 10 supports the first electrode 11, and is transparent, so that external light can pass there through. For example, the first substrate 10 may be formed of transparent glass or transparent plastic. The transparent plastic may be polyethylene terephthalate (PET), polyethylene naphthalate (PEN), polycarbonate (PC), polypropylene (PP), polyimide (PI), or tri-acetyl cellulose (TAC).

The first electrode 11 may be formed of indium-tin oxide, indium oxide, tin oxide, zinc oxide, sulfur oxide, fluorine oxide, or a combination thereof. Alternatively, the first electrode 11 may be formed of a transparent material, such as $ZnO—Ga_2O_3$, or $ZnO—Al_2O_3$. The first electrode 11 may be formed to have a single layer, or multiple layers.

The porous layer 13 is formed on the first electrode 11. The porous layer 13 includes metal oxide particles 131 that are formed through a self-assembly process. The metal oxide particles 131 have a very fine, uniform mean diameter. The porous layer 13 may include uniform-sized nanopores. A mean diameter of the nanopores may be 7.5-15 nm. As the nanopores are designed to have a proper mean diameter size, the movement of electrons is facilitated in the electrolyte layer 30, to improve a necking characteristic of the metal oxide particles.

The porous layer 13 may have a thickness of 10-3,000 nm, for example, 10-1,000 nm. However, the present invention is not limited thereto. The thickness of the porous layer 13 may vary, in accordance with the development of technology.

The metal oxide particles 131 may be formed of titanium oxide, zinc oxide, tin oxide, strontium oxide, indium oxide, iridium oxide, lanthanum oxide, vanadium oxide, molybdenum oxide, tungsten oxide, niobium oxide, magnesium oxide, aluminum oxide, yttrium oxide, scandium oxide, samarium oxide, gallium oxide, strontium-titanium oxide, or the like. In some embodiments the metal oxide particles 131 are formed of titanium oxide ($TiO_2$), tin oxide ($SnO_2$), tungsten oxide ($WO_3$), zinc oxide (ZnO), or a combination thereof.

The dye 15, which generates excitation electrons by absorbing external light, is adsorbed on a surface of the porous layer 13. The dye 15 may comprise at least one of ruthenium-based photosensitive dye and an organic-based dye.

An electrolyte of the electrolyte layer 30 includes redox couples that transfer electrons received from a counter electrode to the dye. The redox couples are formed of iodine ($I_2$)/iodized salt. $I^-$ and $I_3^-$ ions may be generated from the iodine ($I_2$) and iodized salt. The $I^-$ and $I_3^-$ ions coexist, and participate in a reversible reaction. The iodized salt may be selected from the group consisting of lithium iodide, sodium iodide, potassium iodide, magnesium iodide, copper iodide, silicon iodide, manganese iodide, barium iodide, molybdenum iodide, calcium iodide, iron iodide, cesium iodide, zinc iodide, mercury iodide, ammonium iodide, methyl iodide, methylene iodide, ethyl iodide, ethylene iodide, isopropyl iodide, isobutyl iodide, benzyl iodide, benzoyl iodide, allyl iodide, and imidazolium iodide. However, the iodized salt is not limited to these materials.

In the electrolyte layer 30, the content of the iodized salt may be 150-3,000 parts by weight, based on 100 parts by weight of the iodine ($I_2$). When the content of the iodized salt is less than 150 parts by weight, based on 100 parts by weight of the iodine ($I_2$), the reaction may not be effectively realized. When the content of the iodized salt is greater than 3,000 parts by weight, based on 100 parts by weight of the iodine ($I_2$), a current value may be reduced, by an interfering electron flow.

An organic solvent contained in the electrolyte c may be selected from the group consisting of acetonitrile, ethylene glycol, butanol, isobutyl alcohol, isopentyl alcohol, isopropyl alcohol, ethyl ether, dioxane, tetrahydrobutane, tetrahydrofuran, n-butyl ether, propyl ether, isopropyl ether, acetone, methylethylketone, methylbuthylketone, thylisobuthylketonethylene, carbonate, diethylcarbonate, prophylene carbonate, dimethyl carbonate, ethyl methyl carbonate, Γ-butyrolactone, N-methyl-2-pyrrolidone, 3-methoxypropionitrile, and a combination thereof. However, the organic solvent is not limited to these materials. The content of the organic solvent of the electrolyte may be 10-90% by weight. In addition, the organic solvent may not be required. For example, since some materials, such as imidazolium-based iodine, exist in a liquid state, there may be no need for an organic solvent.

The second substrate 20 supports the second electrode 21. The second substrate 20 may be formed of a transparent material, such as glass, or plastic, like the first substrate 10. The second electrode 21 is a counter electrode, and faces the first electrode 11. The second electrode 21 may include a transparent electrode 21a and a catalyst electrode 21b.

The transparent electrode 21a may be formed of a transparent material, such as indium-tin oxide, fluoro-tin oxide, antimony-tin oxide, zinc oxide, tin oxide, $ZnO—Ga_2O_3$, or $ZnO—Al_2O_3$. The first electrode 11 may be formed to have a single layer or multi-layer structure. The catalyst electrode 21b functions to activate redox couples. The catalyst electrode 21b is formed of the bi-phase platinum catalyst, particularly, the platinum-titanium oxide bi-phase catalyst.

The first substrate 10 and the second substrate 20 are adhered to each other by an adhesive 41. The electrolyte 30 is injected through a hole 25a formed through the second substrate 20 and the second electrode 21, to form the electrolyte layer 30 between the first electrode 11 and the second electrode 21. The electrolyte of the electrolyte layer 30 is uniformly distributed in the porous layer 13. The electrolyte receives the electrons from the second electrode 12, through reduction/oxidation, and transfers the electrons to the dye 15. The hole 25a is sealed by an adhesive 42 and a glass cover 43.

The following examples are provided in order to describe the aspects of present invention in more detail. However, these examples are for illustrative purposes only, and are not intended to limit the scope of the invention.

Example 1

P123/ACA was obtained by dissolving 5 g of P123 (BASF Corporation) [(Poly(ethylene glycol)-block-poly(propylene glycol)-block-poly(ethylene glycol) ($PEO_{20}$-$PPO_{70}$-$PEO_{20}$) (the numbers represent repeating numbers) Mw=5,750], in 40 g of acetyl acetone (ACA). In addition, a TTIP/ACA solution was obtained, by dissolving 7.1 g of titanium isopropoxide (TTIP) in 10 g of ACA, in a glove box. The molarity of the TTIP/ACA solution was 0.072M.

The TTIP/ACA solution was drop-added to the P123/ACA solution, and the resulting solution was agitated for 12 hours, thereby obtaining a transparent yellow solution. 0.1 mol/L of $H_2PtCl_6$, which was the platinum precursor, was added to the resulting solution, to obtain a template polymer solution containing a Ti precursor.

The template polymer solution containing Ti precursor was spin-coated on an ITO conductive substrate. The spin coating was performed at 2000 rpm for 20 seconds.

Next, the resulting material was heat-treated at 450° C. for 30 minutes, to form a platinum-titanium oxide ($TiO_2$) electrode. This electrode was used as a second electrode.

A dispersed solution of titanium oxide particles, each having a diameter of 30 nm, was applied using a Doctor Blade method, on 1 $cm^2$ of an ITO film of a first electrode. The applied solution was heat-treated at 450° for 30 minutes, thereby forming a porous layer having a thickness of 15 μm.

Next, the resulting material was maintained at 80°, and used as the dye (ruthenium-based dye N719, SOLARONIX, Switzerland), and then underwent a dye adsorption process for 12 hours, by being impregnated in 0.3 mM of a dispersed solution that was dissolved in ethanol. Then, the porous layer adsorbing the dye was washed out by ethanol, and dried at room temperature, thereby obtaining a first electrode, on which a light absorption layer was formed.

As described above, the second electrode was the platinum-titanium oxide (TiO2) electrode, and a fine hole having a diameter of 0.75 mm was formed through the second electrode, to inject the electrolyte. A support, formed of a polymer film having a thickness of 60 μm, was disposed between the first electrode, on which the porous layer was formed, and the second electrode. The first and second electrodes were pressed at 100° for 9 seconds, and thereby adhered to each other. Next, the electrolyte was injected through the fine hole formed through the second electrode, and the fine hole was sealed by a glass cover and a thermoplastic polymer film, thereby completing the manufacture of a dye-sensitized solar cell. The electrolyte was prepared by dissolving 1-hexyl-2,3-dimethyl imidazoliumiodide, 0.1M of lithium iodide, 0.05M of iodine, and 0.5M of 4-tert-butylpyridine, in 3-methoxypropionitrile.

Example 2

A bi-phase platinum-titanium oxide ($TiO_2$) electrode and a dye-sensitized solar cell were obtained using the same method as Example 1, except that molarity of the TTIP/ACA solution was changed, as shown in Table 1 below.

Figure 3A:
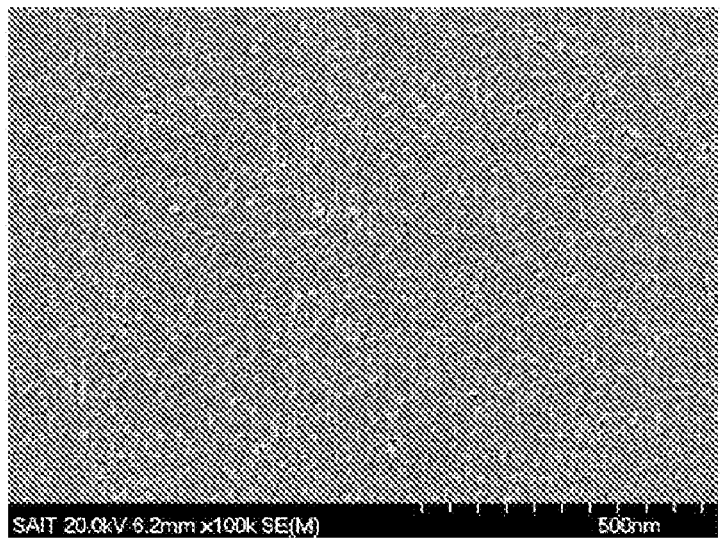
FIGS. 3A, 3B, 4A, 4B, 5 and 6 are scanning electron microscope (SEM) and transmission electron microscope (TEM) micrographs of a bi-phase platinum-titanium oxide ($TiO_2$) electrode of Example 1 and an electrode of Comparative Example 1.
Figure 3B:
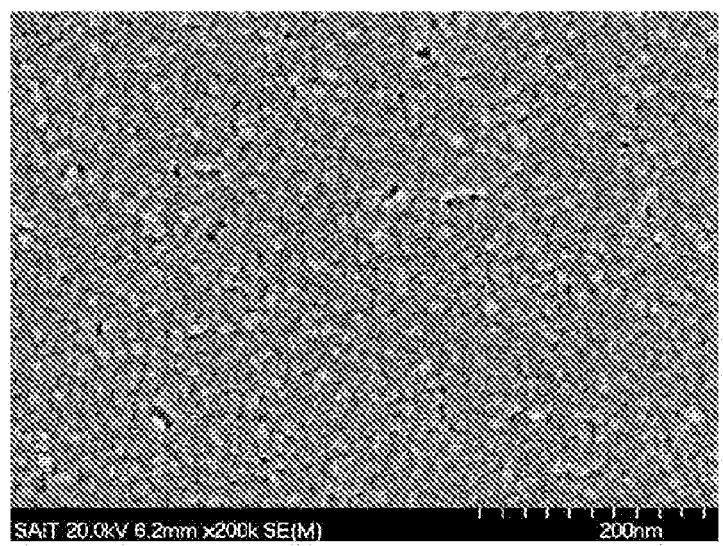
Figure 4A:
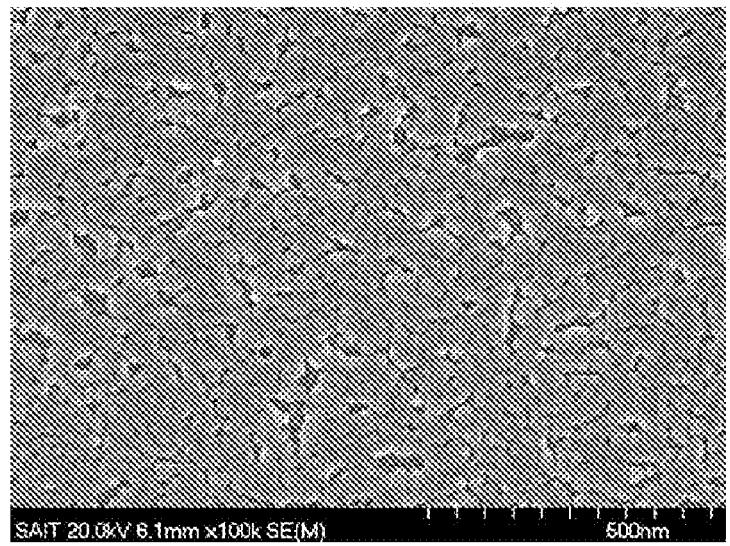
Figure 4B:
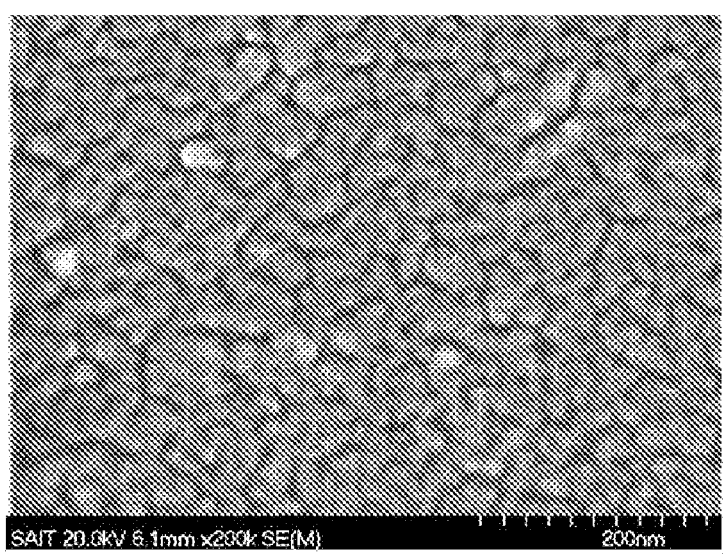

FIGS. 3A, 3B, 4A, 4B, 5, and 6 are scanning electron microscope (SEM) and transmission electron microscope (TEM) micrographs of a bi-phase platinum-titanium oxide ($TiO_2$) electrode of Example 1, and an electrode of Comparative Example 1. FIGS. 3A and 3B are SEM micrographs of the bi-phase platinum-titanium oxide electrode of Example 1, and FIGS. 4A and 4B are SEM micrographs of a platinum electrode formed by coating the platinum salt, according to Comparative Example 1. As shown in the micrographs, the platinum particles of the platinum-titanium oxide electrode of Example 1 are more densely formed than those in the electrode of Comparative Example 1.

Figure 5:
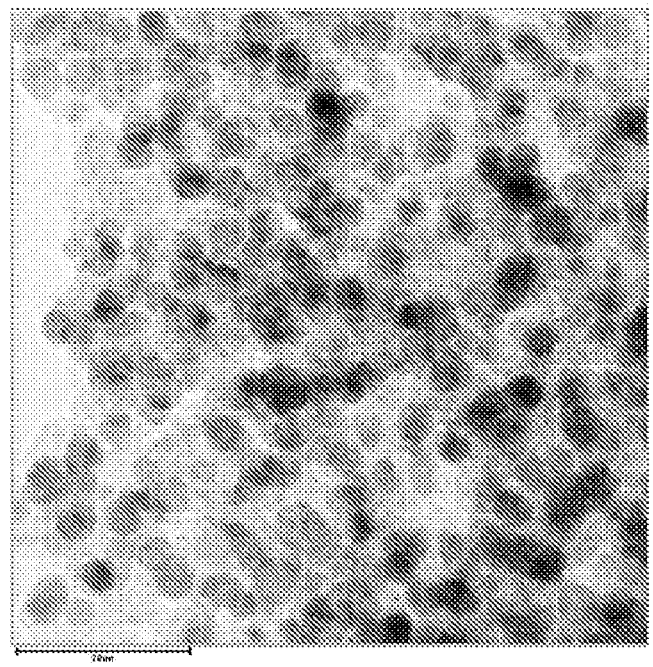
Figure 6:
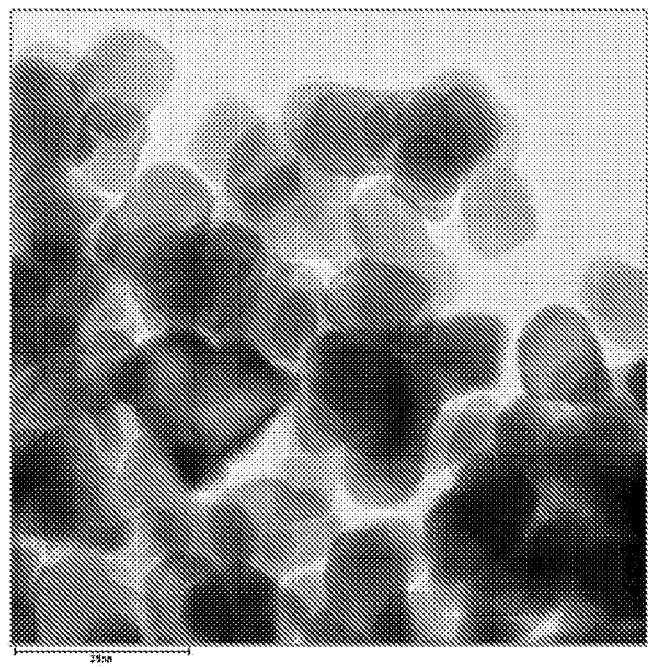

FIG. 5 is a TEM micrograph of the bi-phase platinum-titanium oxide electrode of Example 1, and FIG. 6 is a TEM micrograph of the electrode of Comparative Example 1. As shown in the drawings, the diameter of the platinum particles, of the bi-phase platinum-titanium oxide electrode of Example 1, is less than that of Comparative Example 1. It can be further noted that the platinum particles are surrounded by an amorphous ($TiO_2$) matrix.

Figure 7:
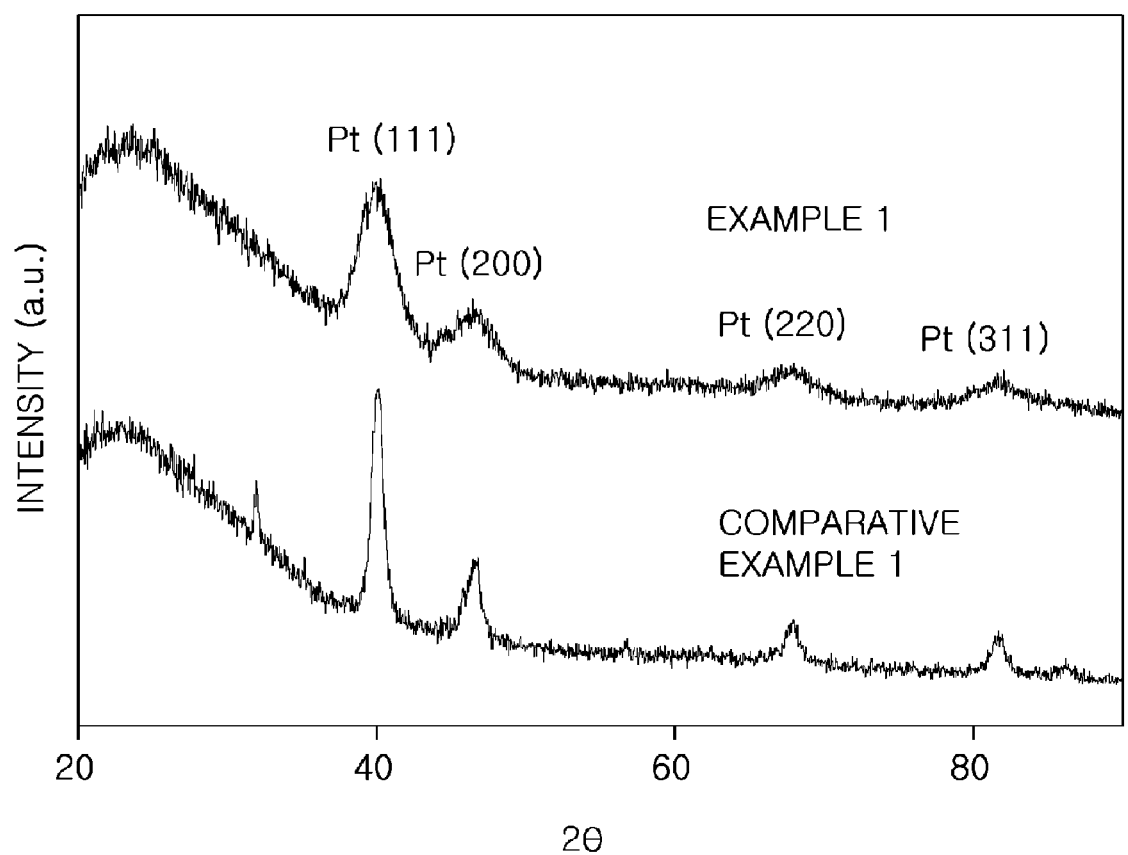
FIG. 7 is a graph illustrating XRD analyzing results of a platinum-titanium oxide ($TiO_2$) electrode of Example 1 and an electrode of Comparative Example 1.

An XRD analysis was performed for the bi-phase platinum-titanium oxide ($TiO_2$) electrode of Example 1 and the electrode of Comparative Example 1. The analysis results are shown in the graph of FIG. 7. Referring to FIG. 7, platinum crystal peaks were found in both the bi-phase platinum-titanium oxide ($TiO_2$) electrode of Example 1 and the electrode of Comparative Example 1. The increase of the FWHM value shows that a grain size of the platinum particles, of the bi-phase platinum-titanium oxide ($TiO_2$) electrode of Example 1, is reduced. This result is identical to the result of the SEM/TEM micrograph analysis described above.

A short circuit current, an open circuit voltage, a packing coefficient, and a photoelectric conversion efficiency of Example 2 were measured, and are shown in Table 1 below.

TABLE 1

| Mixture Ratio of Ti-Precursor and ACA (Molarity M) | Short Circuit Current Jsc ($mA \cdot cm^{-2}$) | Open Circuit Voltage Voc (V) | Packing Coefficient FF (%) | Photoelectric Conversion Efficiency η (%) |
| --- | --- | --- | --- | --- |
| 8:2(TTIP = 0.064M) | 14.34 | 0.784 | 68.2 | 7.67 |
| 6:4(TTIP = 0.048M) | 14.26 | 0.791 | 68.4 | 7.71 |
| 4:6(TTIP = 0.032M) | 14.73 | 0.798 | 68.6 | 8.06 |
| 3:7(TTIP = 0.024M) | 14.76 | 0.798 | 68.9 | 8.12 |
| 2:8(TTIP = 0.016M) | 14.78 | 0.799 | 69.8 | 8.24 |
| 1:9(TTIP = 0.008M) | 14.52 | 0.803 | 68.8 | 8.02 |

As shown in Table 1, the photoelectric conversion efficiency of the solar cells varies according to the content of the titanium precursor. In particular, the photoelectric conversion efficiency was greatest when the titanium precursor solution was 0.016M per 0.1 mol/L of the platinum precursor.

Comparative Example 1

Molarity of the $H_2PtCl_6$, which is the platinum precursor, was fixed at 0.10 mol/L, and a platinum solution was prepared by using ACA. This resulting solution was spin-coated on an ITO conductive substrate, as in Example 1. The spin coating was performed at 2000 rpm for 20 seconds. Subsequently, the conductive substrate, on which the resulting solution was coated, was heat-treated at 450° C. for 30 minutes, to prepare a platinum electrode. A dye-sensitized solar cell was prepared using the platinum electrode as the second electrode, as in Example 1.

Comparative Example 2

A dye-sensitized solar cell was prepared using the same method as Comparative Example 1, except that the second electrode was prepared by depositing a second conductive film formed of Pt on a first conductive film, using a sputtering process.

Open circuit voltages, short circuit currents, packing coefficients, and photoelectric conversion efficiencies, of the dye-sensitized solar cells of Example 2 and Comparative Examples 1 and 2, are shown in Table 2 below.

TABLE 2

|  | Short circuit current Jsc (mA · cm$^{-2}$) | Open circuit voltage Voc (V) | Packing coefficient FF (%) | Photoelectric conversion efficiency η (%) |
| --- | --- | --- | --- | --- |
| Example 2 (TTIP = 0.016M) | 14.78 | 0.799 | 69.8 | 8.24 |
| Comparative Example 1 | 14.51 | 0.790 | 70.0 | 8.03 |
| Comparative Example 2 | 14.17 | 0.793 | 71.4 | 8.02 |

As shown in Table 2, when the bi-phase platinum-titanium oxide (TiO$_2$) electrode of Example 2 (TTIP 0.016 mol/L) was used, the packing coefficient was slightly reduced, but the short circuit current increased, and thus, the photoelectric conversion efficiency of Example 1 is higher that those of Comparative Examples 1 and 2. This is because a non-surface area, of the bi-phase platinum-titanium oxide (TiO$_2$) electrode of Example 1, is further increased, as compared with Comparative Examples 1 and 2. In particular, when the platinum electrode was prepared by coating the platinum salt as in Comparative Example 1, the intimacy between the platinum electrode and the conductive substrate was reduced. Therefore, it is difficult to realize uniform coating (particularly when a large-sized electrode is manufactured). However, Example 2 can prevent this problem. Additionally, when the platinum electrode is formed through the sputtering process as in Comparative Example 2, it is difficult to manufacture a large-sized electrode. Moreover, an expensive manufacturing apparatus is required, and a large amount of platinum is used. However, Example 2 overcomes these problems.

Figure 8:
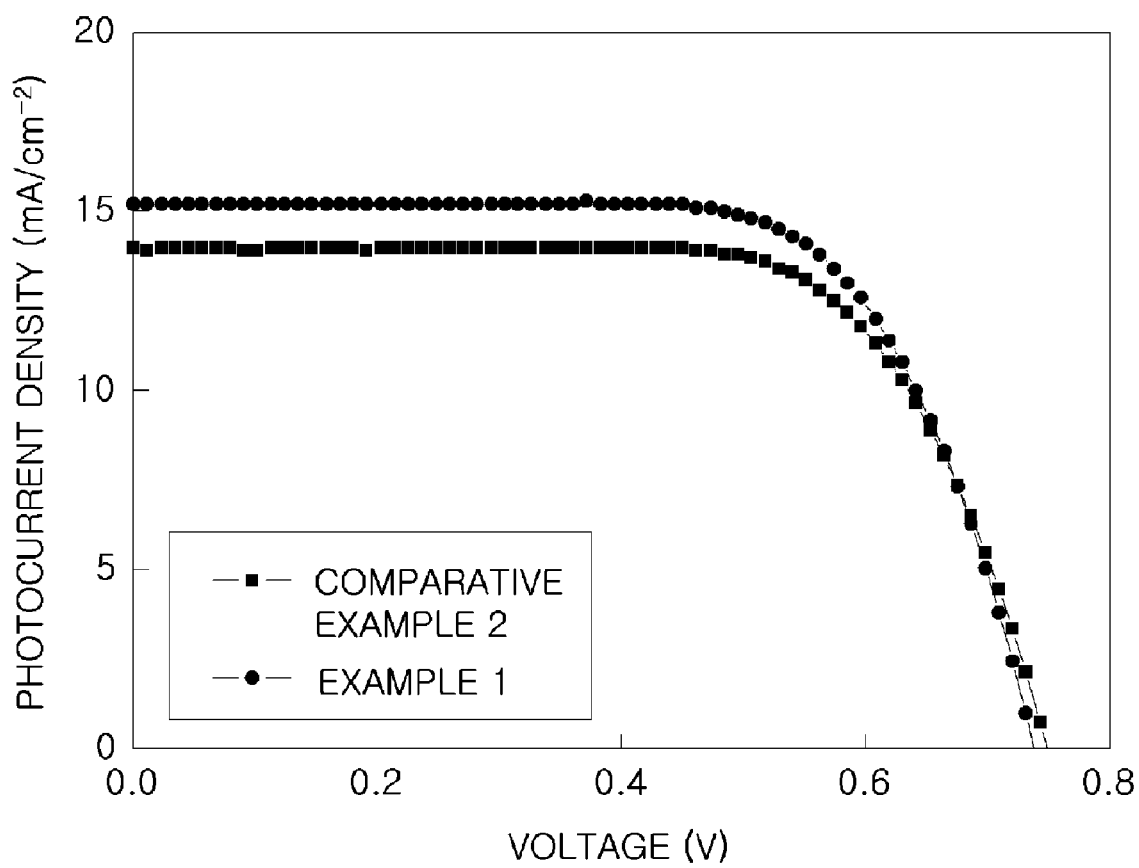
FIG. 8 is a graph illustrating photocurrent density properties, according to voltages in the dye-sensitized solar cells of Example 1 and Comparative Example 1.

Photocurrent densities, of the dye-sensitized solar cells of Examples 1 and 2, were measured, and are shown in the graph of FIG. 8. Referring to FIG. 8 the photoelectric conversion current, of the solar cell using the bi-phase platinum-titanium oxide (TiO$_2$) electrode of Example 1, is greater than that of the solar cell using the bi-phase platinum-titanium oxide (TiO$_2$) electrode of Example 2.

Although a few exemplary embodiments of the present invention have been shown and described, it would be appreciated by those skilled in the art that changes may be made in these exemplary embodiments, without departing from the principles and spirit of the invention, the scope of which is defined in the claims and their equivalents.

What is claimed is:

1. A bi-phase platinum catalyst comprising:
platinum particles having a mean diameter of from 2-5 nm; and
an amorphous metal oxide disposed as a matrix surrounding each of the platinum particles,
wherein the bi-phase catalyst exhibits a main peak, having a Bragg angle of 2θ, for a CuK-α x-ray wavelength of 1.541 Å, at 37-42°.

2. The bi-phase platinum catalyst of claim 1, wherein the amorphous metal oxide is selected from the group consisting of TiO$_2$, NiO, SnO$_2$, ZnO, and a combination thereof.

3. The bi-phase platinum catalyst of claim 1, wherein the content of the platinum particles is 50-200 parts by weight, based on 100 parts by weight of the amorphous metal oxide.

4. A bi-phase platinum catalyst comprising:
platinum particles having a mean diameter of from 2-5 nm; and
an amorphous metal oxide disposed as a matrix surrounding each of the platinum particles,
wherein the bi-phase catalyst exhibits a main peak, having a Bragg angle of 2θ for a CuK-α x-ray wavelength of 1.541 Å, at 37-42°, and a full width at half maximum (FWHM) value of the main peak is 0.02-0.20 rad.

5. A bi-phase platinum catalyst comprising:
platinum particles having a mean diameter of from 2-5 nm; and
an amorphous metal oxide disposed as a matrix surrounding each of the platinum particles,
wherein, when the bi-phase catalyst exhibits a main peak, having a Bragg angle of 2θ for a CuK-α x-ray wavelength of 1.541 Å, at 39.9-40.1°, and a sub-peak at 46.5-47°, when the 2θ is 40±0.1°, and a FWHM value of the main peak is 0.035-0.17 rad.

6. A method of manufacturing a bi-phase platinum catalyst comprising platinum particles and an amorphous metal oxide disposed as a matrix surrounding each of the platinum particles, the method comprising:
preparing a bi-phase platinum catalyst composition by mixing block copolymers, a platinum precursor, a metal oxide precursor, and a solvent, to form micelles in the bi-phase platinum catalyst composition; and
heat-treating the bi-phase platinum catalyst composition.

7. The method of claim 6, wherein the block copolymers are selected from the group consisting of a poly(ethylene oxide)-poly(propylene oxide)-poly(ethylene oxide) (PEO-PPO-PEO) block copolymer, a poly(propylene oxide)-poly(ethylene oxide)-poly(propylene oxide) (PPO-PEO-PPO) block copolymer, and a combination thereof.

8. The method of claim 6, wherein the metal oxide precursor is titanium isopropoxide, titanium methoxide, or titanium ethoxide.

9. The method of claim 6, wherein the platinum precursor is selected from the group consisting of H$_2$PtCl$_6$, H$_2$PtCl$_4$, [Pt(NH$_3$)$_4$]Cl$_2$, and a combination thereof.

10. The method of claim 6, wherein the heat-treating is performed at a temperature of 400-500° C.

11. A solar cell comprising an electrode comprising a bi-phase platinum catalyst comprising:
platinum particles having a mean diameter of from 2-5 nm; and
an amorphous metal oxide disposed as a matrix surrounding each of the platinum particles wherein a main peak, having a Bragg angle of 2θ for a CuK-α x-ray wavelength of 1.541 Å, appears at 37-42°.

12. The solar cell of claim 11, wherein the amorphous metal oxide is selected from the group consisting of TiO$_2$, NiO, SnO$_2$, ZnO, and a combination thereof.

13. The solar cell of claim 11, wherein the content of the platinum particles is 50-200 parts by weight, based on 100 parts by weight of the amorphous metal oxide.

14. The solar cell of claim 11, wherein a full width at half maximum (FWHM) value of the main peak is 0.02-0.20 rad.

15. The solar cell of claim 11, wherein the main peak, appears at 39.9-40.1°, a sub-peak appears at 46.5-47°, the 2θ is 40±0.1°, and a FWHM value of the main peak is 0.035-0.17 rad.

16. The solar cell of claim 11, wherein the solar cell is a dye-sensitized solar cell.

* * * * *

UNITED STATES PATENT AND TRADEMARK OFFICE
CERTIFICATE OF CORRECTION

Page 1 of 1

PATENT NO. : 7,767,618 B2
APPLICATION NO. : 12/167595
DATED : August 3, 2010
INVENTOR(S) : Moon-Sung Kang et al.

It is certified that error appears in the above-identified patent and that said Letters Patent is hereby corrected as shown below:

In the Claims

| | |
|---|---|
| Column 9, Claim 1, line 54 | Delete "from" |
| Column 10, Claim 4, line 2 | Delete "from" |
| Column 10, Claim 5, line 11 | Delete "from" |
| Column 10, Claim 11, line 45 | Delete "from" |
| Column 10, Claim 11, line 48 | After "particles" insert --,-- |

Signed and Sealed this
Sixth Day of March, 2012

David J. Kappos
*Director of the United States Patent and Trademark Office*